US009423416B2

(12) United States Patent
Nambu et al.

(10) Patent No.: US 9,423,416 B2
(45) Date of Patent: Aug. 23, 2016

(54) SCANNING PROBE MICROSCOPE AND MEASURING METHOD USING SAME

(75) Inventors: Akira Nambu, Tokyo (JP); Tsuyoshi Yamamoto, Tokyo (JP); Hideaki Koizumi, Tokyo (JP); Tomihiro Hashizume, Tokyo (JP); Seiji Heike, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/416,968

(22) PCT Filed: Aug. 28, 2012

(86) PCT No.: PCT/JP2012/071734
§ 371 (c)(1),
(2), (4) Date: Feb. 28, 2015

(87) PCT Pub. No.: WO2014/033844
PCT Pub. Date: Mar. 6, 2014

(65) Prior Publication Data
US 2015/0177275 A1 Jun. 25, 2015

(51) Int. Cl.
*G01Q 10/04* (2010.01)
*G01Q 30/02* (2010.01)
(Continued)

(52) U.S. Cl.
CPC ............. *G01Q 10/04* (2013.01); *G01Q 30/02* (2013.01); *G01Q 30/14* (2013.01); *G01Q 60/22* (2013.01)

(58) Field of Classification Search
CPC ....... G01Q 10/04; G01Q 60/22; G01Q 30/14; G01Q 30/02
USPC .................................................. 850/3, 24, 30
See application file for complete search history.

(56) References Cited

U.S. PATENT DOCUMENTS 8,904,561 B2 * 12/2014 Wickramasinghe ... G01Q 30/02
850/24
9,046,492 B1 * 6/2015 Prater .................. G01N 21/658
(Continued)

FOREIGN PATENT DOCUMENTS

JP 2002-310880 A 10/2002
JP 2004-530105 A 9/2004
(Continued)

OTHER PUBLICATIONS

Kitano, H., et al., "Correlation between Biocompatibility of Polymer Materials and Their Hydration Structure", Journal "Polymers", vol. 58, pp. 74-77, Feb. 2009, The Society of Polymer Science, Japan.
(Continued)

*Primary Examiner* — Michael Maskell
(74) *Attorney, Agent, or Firm* — Miles & Stockbridge P.C.

(57) ABSTRACT

Provided is a scanning probe microscope that takes measurements at high spatial resolution on physical information such as array structure of water molecules at a specimen-culture fluid interface in a culture fluid as well as irregularities of the surface of a specimen and composition distribution and array structure of molecules, proteins, etc. even in the atmosphere, an ambient air, vacuum, among others. The scanning probe microscope includes: a probing needle (1); a specimen holder (11) in which a specimen (3) is mounted; an oscillator (2) that produces a periodic oscillation to change the probing needle position; a pulse oscillation type laser light source (27, 28) that emits light toward a spot, which is put under measurement by the probing needle, on the specimen; a detector (25) that measures intensity of output light which is output from the specimen by energy spectroscopy; and a control device (26). The control device decreases amplitude of the periodic oscillation to change the probing needle position by the oscillator, shortens a relative distance between the probing needle and the specimen, and synchronizes shortening of the distance between the probing needle and the specimen and emission of pulse oscillation laser light, thus optimizing efficiency of tip-enhanced detection.

15 Claims, 7 Drawing Sheets

(51) Int. Cl.
*G01Q 30/14* (2010.01)
*G01Q 60/22* (2010.01)

(56) References Cited

U.S. PATENT DOCUMENTS

| | | | |
|---|---|---|---|
| 2006/0043276 A1 | | 3/2006 | Saito et al. |
| 2012/0319679 A1* | | 12/2012 | Heike .................... B82Y 35/00 324/207.13 |

FOREIGN PATENT DOCUMENTS

| | | | | |
|---|---|---|---|---|
| JP | 2006-071448 | A | | 3/2006 |
| JP | 2007-132781 | A | | 5/2007 |
| JP | 2007132781 | A | * | 5/2007 |
| JP | 2008-102150 | A | | 5/2008 |
| JP | 2010-002291 | A | | 1/2010 |
| JP | 2010-071871 | A | | 4/2010 |
| JP | 2010071871 | A | * | 4/2010 |
| JP | 2010-286397 | A | | 12/2010 |
| JP | 2011-027582 | A | | 2/2011 |
| WO | WO 02/054071 | A1 | | 7/2002 |

OTHER PUBLICATIONS

Inouye, Y., et al., "Tip-enhanced Near-field Raman Spectroscopy for Nano-imaging", Journal "Surface Science", vol. 26, No. 11, pp. 667-674, 2005.

Wada, A., et al., "Surface Vibrational Spectroscopy by Sum Frequency Generation", Journal of the Spectroscopical Research of Japan, 42(3), Jun. 30, 1993, pp. 140-148.

Yamaguchi, A., et al., "Analysis of Associated Structures of Rhodamine B Adsorbed at Interfaces by Second Harmonic Generation Spectroscopy", Journal of Japan Society for Analytical Chemistry, 55(7), Sep. 29, 2006, pp. 457-465.

Hashimoto, M., et al., "Coherent Anti-Stokes Raman Scattering Microscopy", IEICE Technical Report. MBE, ME and bio cybernetics, 102(387), Oct. 11. 2002, pp. 25-28.

* cited by examiner

F I G . 1
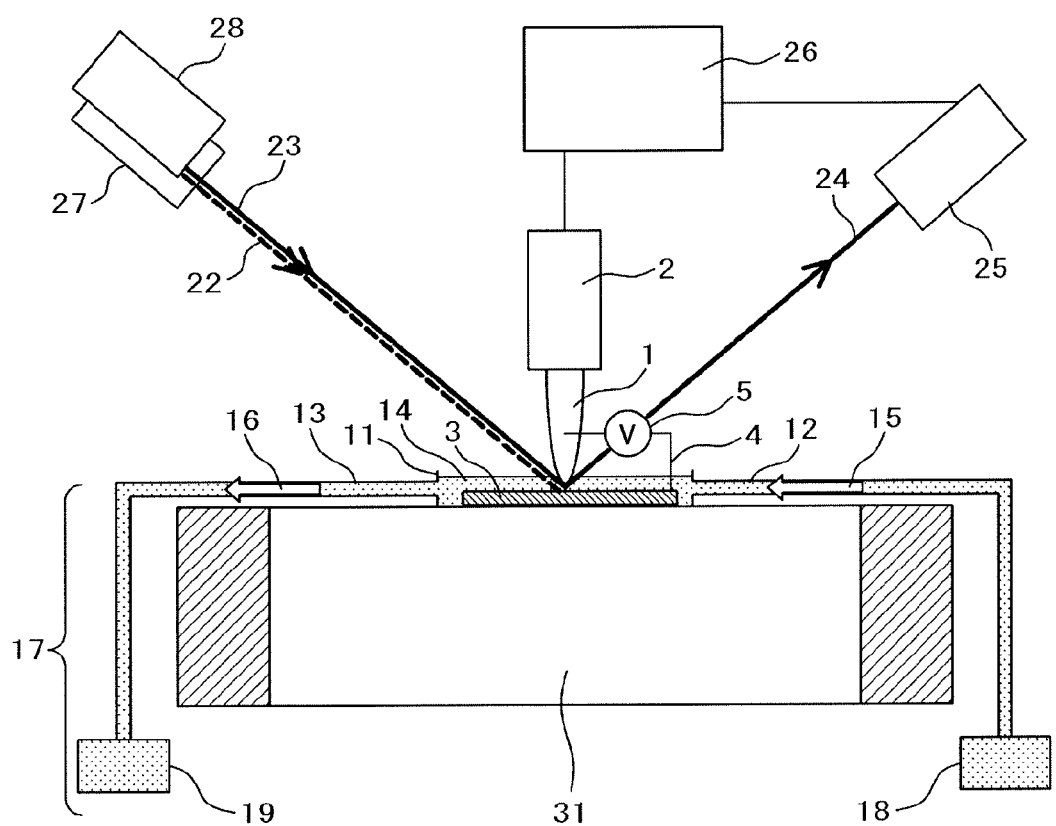

SCANNING PROBE MICROSCOPE AND MEASURING METHOD USING SAME

TECHNICAL FIELD

The present invention relates to a scanning probe microscope that takes measurements at high spatial resolution on physical information such as orientation distribution of water molecules at a specimen-culture fluid interface in a culture fluid as well as irregularities of the surface of a specimen in a culture fluid, potential distribution, and composition distribution and array structure of molecules, proteins, etc.

BACKGROUND ART

For measurement, evaluation, and control of a biological reaction such that cells adhere to a biological substrate material in a culture fluid and then grow and differentiate, a phenomenon of hydration of biomolecules, biotissues, biological substrate materials, etc. is important. A hydration structure hereof exhibits a three-dimensional structure which is formed by interaction between the surface of a specimen and water molecules and interaction between water molecules including hydrogen bonding at a specimen-culture fluid interface in a culture fluid composed mainly of water. So-called biocompatibility such as typified by adhesion of red blood cells to the inner wall of an artificial blood vessel is thought to be closely related to this hydration structure (e.g., Non-Patent Literature 1). Moreover, inter alia, irregularities of the surface of a specimen in a culture fluid, potential distribution, and composition distribution and array structure of molecules, proteins, etc. are important characteristics especially with regard to biological reactions of biomolecules, biotissues, biological substrate materials, etc. in a culture fluid.

For specimens of biomolecules, biotissues, biological substrate materials, etc. in a culture fluid, as means for observing the specimen-culture fluid interface and taking measurements, optical microscopes and non-linear optical microscopes based on Raman spectroscopy, second harmonic generation spectroscopy, sum-frequency generation spectroscopy, etc. have so far been used. In particular, the sum-frequency generation spectroscopy enables measurement of array structure of water molecules with regard to the hydration structure at the specimen-culture fluid interface. As a non-liner optical microscope, for example, Patent Literature 1 discloses a surface selective and non-linear optical method for observing interaction between a probe and a target by means of second harmonic light and sum-frequency light emitted by water molecules, solvent molecules, or markers in the vicinity of the interface. However, the spatial resolution of these optical microscopes and non-linear optical microscopes is larger than 100 nm and, typically, on the order of 1 µm.

Meanwhile, scanning probe microscopes are based on Atomic Force Microscopy (AFM). A scanning Kelvin probe microscope, which is an example of a scanning probe microscope, uses the following method: while the microscope detects static electric field force exerted between a cantilever having an electrically-conductive probing needle and a specimen in terms of flexure of the cantilever, the probing needle scans the surface of the specimen, thereby mapping distribution of the static electric field force. In addition to static electric field force, atomic force or the like is also applied to the probing needle and it is necessary to separate static electric field power from other interactions. For this reason, the cantilever is first oscillated and the distance between the probing needle and the specimen is adjusted so as to keep constant the oscillation amplitude that is decreased by atomic force exerted when the probing needle contacts with the specimen. Thereby, the position of the specimen surface in a height direction is determined. The probing needle is set apart from that position, i.e., the specimen surface at a certain distance and, in this condition; static electric field force which is long-range force is detected from phase change of the oscillation of the cantilever (e.g., Patent Literature 2). In terminology of scanning probe microscopes, the probing needle may be called a probe.

With scanning probe microscopes, spatial resolution of on the order of 1 nm for irregularity measurement and spatial resolution of on the order of 10 nm for static electric field and optical measurement can be expected. However, because a region of interaction between the probing needle and the specimen is restricted to approximately the diameter of the tip of the probing needle, it is generally difficult to realize a scanning probe microscope using a physical quantity of a weak signal, particularly as in the non-linear optical method.

Literature concerning a tip-enhanced Raman detection method that uses surface-enhanced Raman scattering by a probing needle to compensate this weak signal and realize Raman spectroscopy with a scanning probe microscope is disclosed. Patent Literature 3 discloses a probe for a near-field microscope in which the probe is coated reproducibly with uniform metal particles to efficiently induce surface-enhanced Raman scattering in a near-field microscope that inserts the probe into an evanescent field which is generated on the surface of a sample, scatters the evanescent field by the probe tip, and detects scattering light.

Non-Patent Literature 2 sets forth that irradiating a metallic probing needle whose tip has a nanometer diameter with light makes it possible to trap the light in the nano space of the tip and further irradiating it with molecules as a nano light source enables detection of Raman scattering light from the molecules at a nano spatial resolution. This literature also sets forth that, especially, localized plasmon polariton which is a resonance phenomenon is excited at the tip of the probing needle and enhances electric field strength of light, which effectively increases the scattering cross-section of Raman scattering and compensates weak scatterability (tip-enhanced Raman detection method), and a spatial resolution of 15 nm is realized.

Patent Literature 4 discloses an ultraviolet near-filed optical microscope using a tip-enhanced Raman detection method in which the microscope focuses laser light on a specimen to generate Raman scattering light, brings a probing needle close to or in contact with the specimen so that the tip will enhance and scatter the Raman scattering light, and detects a Raman spectrum from the scattering light which has been scattered. In this regard, excitation laser light is ultraviolet or deep ultraviolet laser light and the material of the tip of the probing needle is a metal having a permittivity of −2 or less at an excitation laser wavelength; it is mentioned that, for example, preferable is an aluminum thin film which was vacuum deposited on the surface of the probing needle made of silicon, in which the film thickness is about 25 nm and metal particles are 10 to 20 nm in diameter.

Patent Literature 5 discloses that, using a near-field optical microscope that, while scanning a specimen by a probe (probing needle), detects near-field light that is generated in the vicinity of the probe by light irradiation, it is possible to observe a change in minute oscillation of molecules adsorbed onto the surface, depending on distance between the probing needle and the specimen, as a change in Raman scattering. In this regard, the light source is, inter alia, a laser such as He—Cd (with a wavelength of 441 nm) and, as the probing needle, a 35 nm silver evaporated probe is used.

Patent Literature 6 discloses a technique for holding a maximum value of a light signal that is detected in sync with a laser in an optical probe microscope.

However, in these literatures, neither a scanning probe microscope using second harmonic generation spectroscopy or sum-frequency generation spectroscopy, nor a scanning probe microscope with high spatial resolution by means of Raman spectroscopy is disclosed.

CITATION LIST

Patent Literature

Patent Literature 1: Japanese Translation of Unexamined PCT Application No. 2004-530105
Patent Literature 2: Japanese Patent Application Laid-Open No. 2011-27582
Patent Literature 3: Japanese Patent Application Laid-Open No. 2006-71448
Patent Literature 4: Japanese Patent Application Laid-Open No. 2010-286397
Patent Literature 5: Japanese Patent Application Laid-Open No. 2010-71871
Patent Literature 6: Japanese Patent Application Laid-Open No. 2002-310880

Non-Patent Literature

Non-Patent Literature 1: Journal "Polymers" vol. 58, 2009, p. 74, Kitano Hiromi, Genmei Makoto
Non-Patent Literature 2: Journal "Surface Science" vol. 26, 2005, p. 667 Inoue Yashusi, et al.

SUMMARY OF INVENTION

Technical Problem

An object of the present invention is to provide a scanning probe microscope that takes measurements at high spatial resolution on array structure of water molecules with regard to the hydration structure at a specimen-culture fluid interface for specimens of biomolecules, biotissues, biological substrate materials, etc. in a culture fluid and takes measurements at high spatial resolution on physical information such as irregularities of the surface of a specimen and composition distribution and array structure of molecules, proteins etc. even in the atmosphere, an ambient air, vacuum, among others.

Solution to Problem

Typical aspects of the invention disclosed in this application are outlined below.

A scanning probe microscope according to the present invention includes a probing needle; a specimen holder in which a specimen is mounted; an oscillator that produces a periodic oscillation to change the probing needle position; a pulse oscillation type laser light source that emits light toward a spot, which is put under measurement by the probing needle, on the specimen; a detector that measures intensity of output light which is output from the specimen by energy spectroscopy; a scanning mechanism that moves the specimen holder; and a control device. The scanning probe microscope is characterized in that the control device controls a relative distance between the probing needle and the specimen and synchronizes shortening of the distance between the probing needle and the specimen and emission of pulse oscillation laser light, thus optimizing efficiency of tip-enhanced detection.

Preferable is the scanning probe microscope according to the present invention, in which the control device decreases amplitude of the periodic oscillation to change the probing needle position by the oscillator, shortens the relative distance between the probing needle and the specimen, and synchronizes shortening of the distance between the probing needle and the specimen and emission of pulse oscillation laser light, thus optimizing efficiency of tip-enhanced detection.

A measuring method using a scanning probe microscope according to the present invention is as follows: a measuring method using a scanning probe microscope including a probing needle; a specimen holder in which a specimen is mounted; an oscillator that produces a periodic oscillation to change the probing needle position; a pulse oscillation type laser light source that emits light toward a spot, which is put under measurement by the probing needle, on the specimen; a detector that measures intensity of output light which is output from the specimen by energy spectroscopy; a scanning mechanism that controls the probing needle position relative to the specimen holder; and a control device, in which the measuring method is characterized by decreasing amplitude of the periodic oscillation to change the probing needle position by the oscillator; shortening a relative distance between the probing needle and the specimen; and synchronizing shortening of the distance between the probing needle and the specimen and emission of pulse oscillation laser light, thus optimizing efficiency of tip-enhanced detection.

Advantageous Effects of Invention

According to the present invention, it would become possible to takes measurements at high spatial resolution on interactions with water and molecules at an interface between biomolecules, biotissues, a biological substrate material, etc. and a culture fluid in the culture fluid. It also would become possible to take measurements at high spatial resolution on physical information such as irregularities of the surface of a specimen and composition distribution and array structure of molecules, proteins etc. even in the atmosphere, an ambient air, vacuum, among others.

BRIEF DESCRIPTION OF DRAWINGS

FIG. 1 is a general structural diagram of a scanning probe microscope of a first embodiment of the present invention.

DESCRIPTION OF EMBODIMENTS

Figure 2:
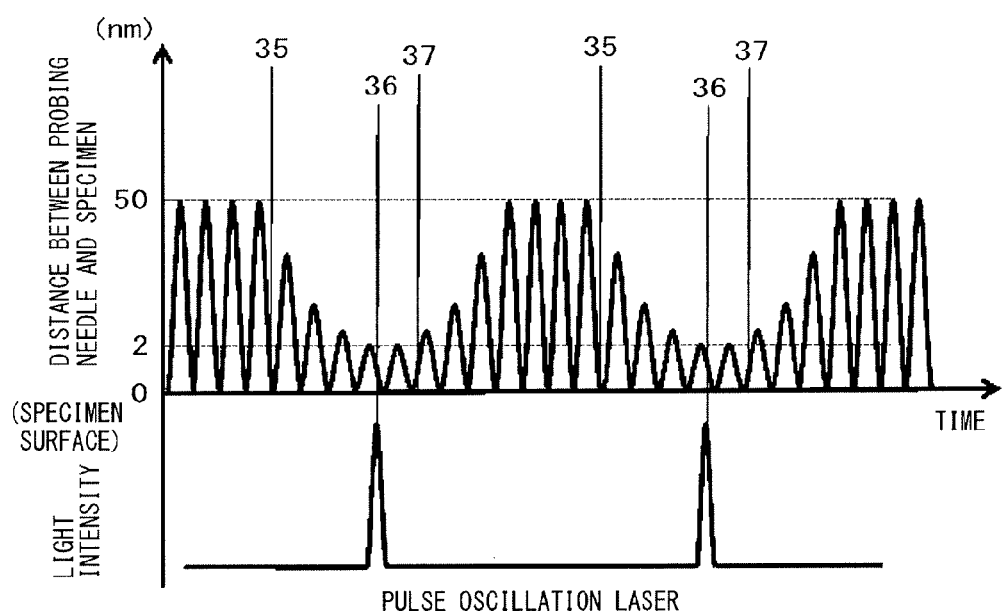
FIG. 2 is a diagram explaining operation of the scanning probe microscope of the first embodiment of the present invention.

The present invention is based on a new finding as below: in a scanning probe microscope by means of a tip-enhanced detection method that compensates weak signal light by positioning a probing needle in near-field light (evanescent light) generated on the surface of a specimen and amplifying electric field strength of light near the specimen surface by near-field light from the probing needle and near-field light from the specimen, it is possible to optimize the tip enhancement effect by measuring detected light intensity that depends on distance between the probing needle and the specimen, since the tip enhancement effect strongly depends on the distance between the probing needle and the specimen when sum-frequency generation (SFG) spectroscopy, second harmonic generation (SHG) spectroscopy, and other linear and nonlinear optical spectroscopy are used.

The present invention will now be described using the following embodiments. An item that is described in the section "description of embodiments", but is not described in the context of a particular embodiment can also be applied to the particular embodiment.

Example 1

This section discloses a tip-enhanced scanning sum-frequency microscope as one form of a scanning probe microscope. FIG. 1 is a general structural diagram of a scanning probe microscope of a first embodiment of the present invention. A probing needle 1 is installed in an oscillator 2 and its position relative to a specimen 3 is controlled by the oscillator 2. As the material of the probing needle 1, a material is selected that, when the probing needle 1 has been positioned in incoming light, amplifies the intensity of near-field light and concentrates the light at or near the tip of the probing needle. If Raman scattering is used like Raman spectroscopy or sum-frequency generation spectroscopy among others, metals such as gold, silver, copper and aluminum and their compounds, which enable effective use of surface-enhanced Raman scattering, may be used. A probing needle with a gold thin film, 1 to 20 nm thick, evaporated on a silicon probing needle is used as an effective probing needle candidate. In the present embodiment, the oscillator 2 principally oscillates in a direction perpendicular to the specimen 3 and the distance between the probing needle 1 and the specimen 3 is controlled to be less than or equal to 300 nm. A natural frequency of the oscillator 2 ranging from 200 kHz to 2 MHz is used. In the present embodiment, as the oscillator 2, a crystal oscillator which is extendable and contractable in a longitudinal direction is used; however, a crystal oscillator of a tuning fork form, an oscillator by means of a piezo element, an oscillator in which a piezo element is placed in a cantilever, etc. which are generally used in a scanning probe microscope such as an atomic force microscope can be used.

It is publicly known that SHG, SFG, and other non-linear optical phenomena are proportional to the square of light intensity. Therefore, in the tip-enhanced scanning sum-frequency microscope as well, the use of a pulse oscillation laser for which intensity per pulse is strong is overwhelmingly advantageous in signal detection than a continuous-wave oscillation laser (CW laser). For example, in the case of a CW laser with an output power of 50 mW at a wavelength of 532 nm, which is used for tip-enhanced Raman, the number of photons per second is $1.34 \times 10^{17}$. On the other hand, a pulse oscillation laser with an output power ranging from 0.1 to 1 mJ at a wavelength of 532 nm is used for SFG. If the pulse oscillation laser is assumed to provide the peak output of 1 mJ, the number of photons contained per pulse is $2.68 \times 10^{15}$. The pulse width of the pulse oscillation laser, when used for SFG, is 20 to 30 ps. The number of photons in the above-mentioned CW laser per time corresponding to this pulse width (20 ps) is $2.7 \times 10^{6}$. The number of photons in the pulse oscillation laser is larger by 9 digits or more than that in the CW laser. Hence, the use of the pulse oscillation laser is overwhelmingly advantage in mapping of non-linear optical characteristics such as SHG and SFG.

However, in order to efficiently detect a signal of SFG or SHG among others, it is necessary that the tip of the probing needle gets sufficiently close to the specimen surface. According to Patent Literature 5, it is mentioned that the effect of Raman signal enhancement is not exhibited when the distance between the probing needle and the specimen is equal to or more than 26.5 nm. It is also mentioned that the enhancement effect increases exponentially when the distance is less than 26.5 nm. Therefore, it is preferable that the distance between the probing needle 1 and the surface of the specimen 3, depicted in FIG. 1, is approximately on the order of 2 nm or less. The distance between the probing needle 1 and the surface of the specimen 3 is controlled by and an oscillation is produced by the oscillator 2. However, the oscillation frequency ranges from 200 kHz to 2 MHz and does not always synchronize with the oscillation frequency ranging from 50 Hz to 200 kHz of a general pulse oscillation laser. A method of synchronizing this is as below: turn off feedback that usually makes the oscillation of the probing needle constant and forcibly bring the probing needle 1 closer to the specimen 3; then, atomic force exerted between them produces a phase shift by which the amplitude of the probing needle decreases; and synchronize the probing needle oscillation with the pulse oscillation laser so that laser pulse irradiation occurs when the amplitude of the probing needle becomes less than or equal to 1 nm, because the amplitude of the probing needle can always be monitored by an AFM mechanism. In this way, it is achievable to maximum the tip enhancement effect. FIG. 2 plots the above distance between the probing needle and the specimen and synchronized oscillation of the pulse oscillation laser. As is represented in FIG. 2, the probing needle oscillates in a tapping mode across the distance between the probing needle and the specimen varying between 0 and on the order of several tens of nanometers. Feedback is turned off at a time instant 35 and the probing needle is forcibly brought closer to the specimen. When the amplitude has become sufficiently small, a feedback in an AFM mode causes the pulse oscillation laser to emit light in sync with a time instant 36 when the distance between the probing needle and the specimen becomes constant (on the order of 2 nm or less). Then, the feedback for oscillation of the probing needle is turned on at a time instant 37. This operation is repeated.

Signal maximization by this synchronization can be used for not only the tip-enhanced scanning sum-frequency microscope, but also a tip-enhanced scanning second harmonic microscope and other tip-enhanced scanning optical probe microscopes by means of non-linear optical characteristics which are set forth in an embodiment which will be described later.

The probing needle 1 is oscillated by the oscillator 2 in a direction perpendicular to the surface of the specimen 3 at a frequency near to the natural frequency of the oscillator 2 (within ±1% of the natural frequency). Interaction (force) between the probing needle 1 and the specimen 3 produces a phase difference between a voltage that is applied to the oscillator 2 and actual oscillation amplitude of the oscillator 2. The phase difference is used in the present embodiment as below: the phase difference between an AC voltage that is applied to the oscillator 2 and a current flowing into the oscillator 2 is used as a measure for quantifying the interaction (force) between the probing needle and the specimen and the distance between probing needle and specimen. While keeping this phase difference constant, scanning is performed by a scanning mechanism 31 so that the relative position of the probing needle 1 to the specimen 3 moves in a direction perpendicular to the specimen and in a planar direction of the specimen. In this way, it is possible to configure an atomic force microscope (AFM) which is one type of a scanning probe microscope and it is possible to measure irregularities of the surface of the specimen. While the probing needle 1 is brought close to the specimen 3 with the distance between them generally varying from 0 nm (contact) at the closest position up to 100 nm, it is also possible to make the probing needle 1 go into the specimen 3. While making a given amount of decrease in the oscillation amplitude of the oscillator 2, by performing scanning by the scanning mechanism 31 so that the relative position of the probing needle 1 to the specimen 3 moves in a direction perpendicular to the specimen and in a planar direction of the specimen, the distance between the probing needle 1 and the specimen 3 can be fixed to 0 nm at the closest position (tapping mode AFM). The probing needle 1 is connected to a power supply 5 for probing needle by a wiring line 4 and an AC voltage and a DC voltage can be applied between the probing needle 1 and the specimen 3. In the present embodiment, surface-treated polycarbonate is used as the specimen 3 and a voltage that is applied between the probing needle 1 and the specimen 3 is not used.

A specimen holder 11 is provided with a culture fluid inlet 12 and a culture fluid outlet 13 and is capable of holding or replacing a culture fluid 14. Instead of the culture fluid 14, water or a solvent can be used. Reference numeral 17 denotes a culture fluid supply and exhaust mechanism which supplies a new culture fluid from a culture fluid supply container 18 to the specimen holder 11 and exhausts a used culture fluid from the specimen holder 11 to a culture fluid exhaust container 19.

A pulse oscillation laser light or plural pulse oscillation laser lights which are input synchronously are input at or near a spot of a specimen 3 where the probing needle 1 gets close to and the intensity of output light 24 is measured by a filter-equipped detector 25. In the present embodiment, a first pulse oscillation laser light 22 which is a green pulse oscillation laser light with a wavelength of 532 nm and a second pulse oscillation laser light 23 which is an infrared pulse oscillation laser light with a variable wavelength ranging from 2.3 to 10 microns are input synchronously. The output light 24 is input to the filter-equipped detector 25 and its intensity at a frequency (sum-frequency) as the sum of the frequency of the first pulse oscillation laser light 22 and the frequency of the second pulse oscillation laser light 23 is measured. By recording the intensity of the sum-frequency output light 24 that depends on the frequency of the second pulse oscillation laser light 23, a sum-frequency spectrum can be obtained. In the present embodiment, by comparing a peak at a wavenumber of 3200 Kaiser and a peak at a wavenumber of 3400 Kaiser, it is possible to discuss orientational proportions of tetrahedrally coordinated water molecules and asymmetrical bonded water molecules at the interface between polycarbonate and the culture fluid 14.

In a case where an AFM is configured and the probing needle 1 is brought sufficiently close to the specimen 3, the intensity of the sum-frequency output light 24 is enhanced dramatically by the tip enhancement effect attributed to the fact that localized plasmon polariton is excited at the tip of the probing needle 1 and enhances electric field strength of light (tip-enhanced sum-frequency generation spectroscopy). Moreover, while making the probing needle 1 scan a part of the surface of the specimen 3, by measuring the intensity of the sum-frequency output light 24 at a particular wavenumber, it is possible to map, at high spatial resolution, spatial distribution of orientations of water molecules at the interface between the specimen 3 and the culture fluid 14 (tip-enhanced scanning sum-frequency microscope). In the present embodiment, the sum-frequency output light 24 is enhanced by 10000 times by the tip enhancement effect and the spatial resolution of the scanning sum-frequency microscope comes up to 10 nm.

Now, the following discloses a method for optimizing the tip enhancement effect and adjusting the detector output to a maximum in the scanning probe microscope of the present embodiment. For the near-field light (evanescent light) that is generated at the probing needle 1 and the surface of the specimen 3, its intensity decreases exponentially as distance from the surface becomes longer. Therefore, the tip enhancement effect can be expected only if the distance between the probing needle 1 and the specimen 3 is sufficiently short. In the present embodiment, the tip enhancement effect takes place when the distance between the probing needle 1 and the specimen 3 is less than or equal to 20 nm. Infinitesimally oscillate the probing needle 1 over a distance of on the order of 1 nm by the oscillator 2 and measure the distance between the probing needle 1 and the specimen 3 (distance between probing needle and specimen). Measure the output of the filter-equipped detector 25, while changing the closest position of the probing needle 1 to the specimen 3 by controlling the scanning mechanism 31 by a control device 26.

Figure 3A:
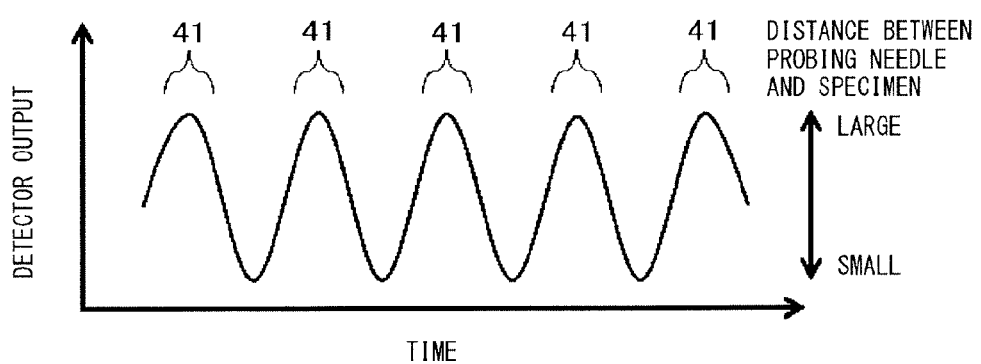
FIG. 3A is a graph representing dependency of detector output on distance between probing needle and specimen in a case where a tip enhancement effect does not take place.
Figure 3B:
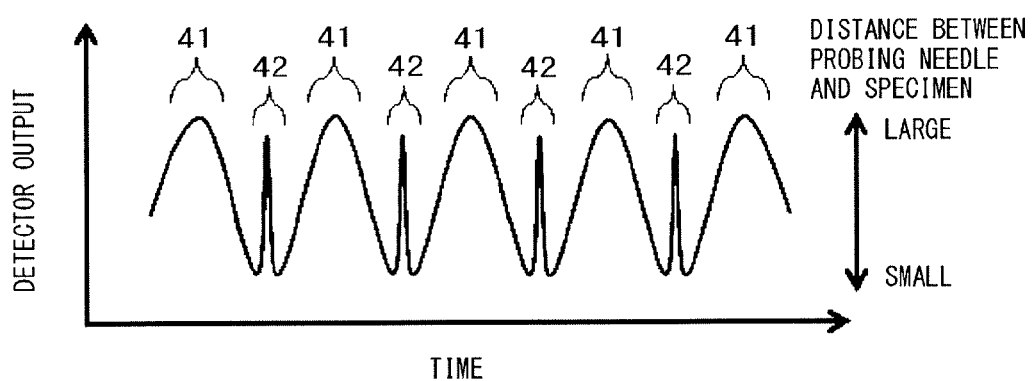
FIG. 3B is a graph representing dependency of detector output on distance between probing needle and specimen in a case where the tip enhancement effect takes place.
Figure 3C:
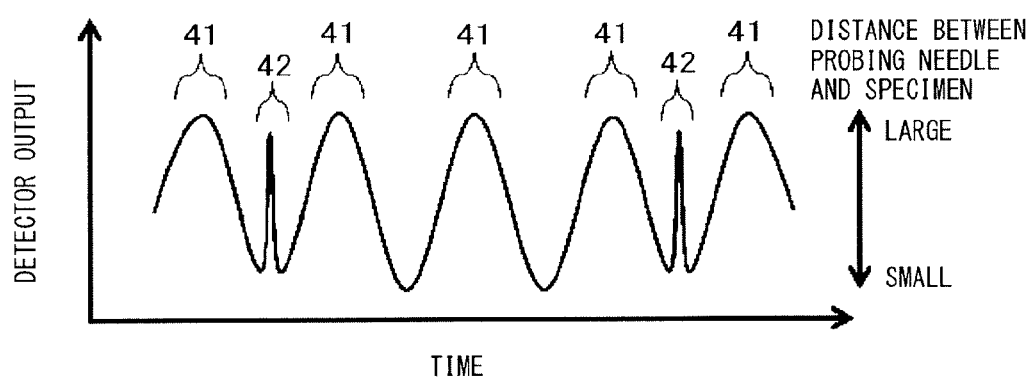
FIG. 3C is a graph representing dependency of detector output on distance between probing needle and specimen in a case where the tip enhancement effect is optimized by synchronizing oscillation of the probing needle and repetition of pulse oscillation laser lights.

FIGS. 3A to 3C are graphs representing dependency of detector output measured by the scanning probe microscope of the present embodiment on distance between probing needle and specimen. FIG. 3A plots detector output for a case where the distance between the probing needle 1 and the specimen 3 is relatively long and the tip enhancement effect does not take place. There are output light peaks 41 according to a geometric condition that the probing needle does not block light; when distance between probing needle and specimen is large, there is a decrease in the amount of pulse oscillation laser lights which are blocked by the probing needle 1. That is, because the lights are blocked when the probing needle 1 gets closer to the specimen 3, the output decreases, as the probing needle gets closer. FIG. 3B plots detector output for a case where distance between the probing needle 1 and the specimen 3 is sufficiently short and the tip enhancement effect takes place. There are output light peaks 41 according to a geometric condition that the probing needle does not block light; when distance between probing needle and specimen is large, there is a decrease in the amount of pulse oscillation laser lights which are blocked by the probing needle 1. There are also output light peaks 42 under the tip enhancement effect when distance between probing needle and specimen is small. Experimental parameters that affect the tip enhancement effect, such as incidence position and angle of the pulse oscillation laser lights, output light angle, a condition of synchronization between the plural pulse oscillation laser lights, the material and shape of the probing needle 1, the frequency and amplitude of oscillation of the oscillator 2, and a condition of synchronization between oscillation of the oscillator 2 and the pulse oscillation laser lights should be set to optimize the output light peaks 42 under the tip enhancement effect. FIG. 3C further plots detector output for a case where, as a normal measurement mode, while the probing needle 1 is oscillated by the oscillator 2, incidence of the pulse oscillation laser lights occurs in sync with time when distance between probing needle and specimen has reached the closest position, where the tip enhancement effect is optimized by synchronizing oscillation of the probing needle 1 and repetition of the pulse oscillation laser lights. This example represents a case under a condition where the repetition frequency of the pulse oscillation laser lights is one third of the frequency of oscillation of the probing needle 1, by way of example. In this regard, it is necessary to appropriately set a phase difference between oscillation of the probing needle 1 and oscillation of output of the filter-equipped detector 25 by the control device 26; it is inherently important to set a value of the phase difference according to measurements plotted in FIGS. 3A and 3B. Depending on distance between the probing needle and the specimen, detector output changes as in FIGS. 3A and 3B and the amplitude of the output light peaks 42 under the tip enhancement effect also changes. The experimental parameters that affect the tip enhancement effect, such as incidence position and angle of the pulse oscillation laser lights, output light angle, a condition of synchronization between the plural pulse oscillation laser lights, the material and shape of the probing needle 1, the frequency and amplitude of oscillation of the oscillator 2, and a condition of synchronization between oscillation of the oscillator 2 and the pulse oscillation laser lights should be adjusted so that the amplitude of the output light peaks 42 will increase.

Figure 4:
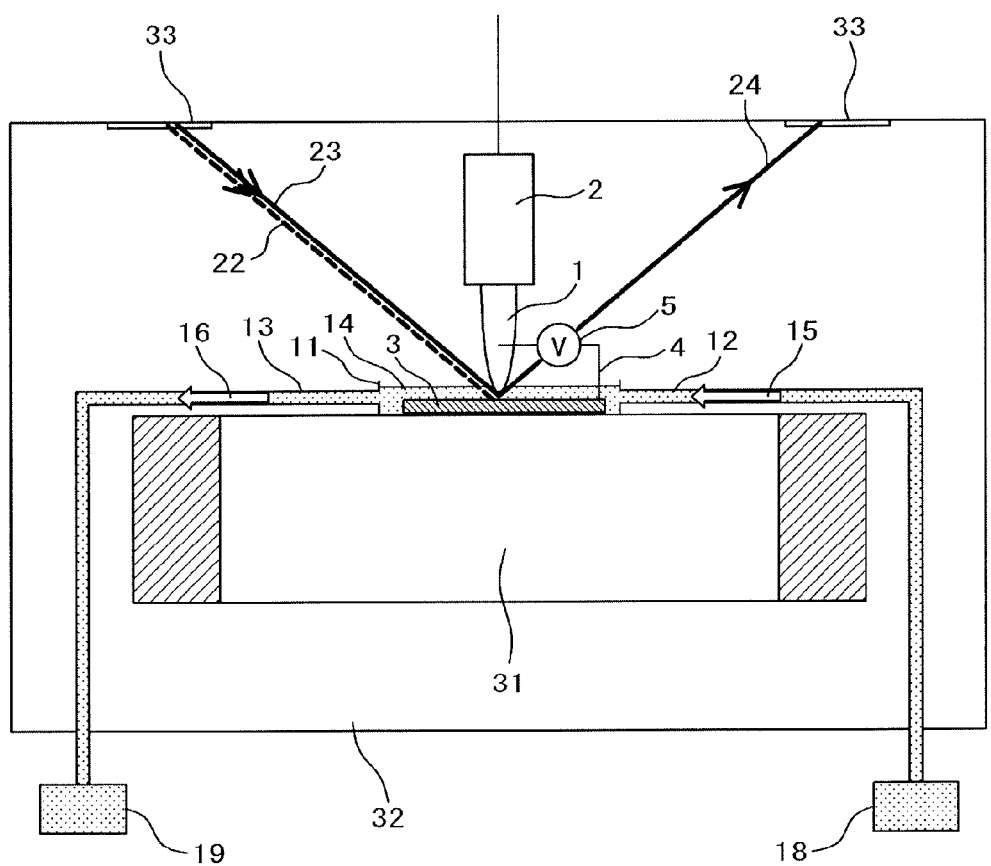
FIG. 4 is a general structural diagram of another scanning probe microscope according to the first embodiment of the present invention.

The scanning probe microscope of the first embodiment may be used inside a cell culturing device. In this use case, as is depicted in FIG. 4, the specimen holder 11, oscillator 2, scanning mechanism 31, etc. are installed inside a cell culturing device 32 and laser oscillators 27 and 28 and a detector 25 are disposed outside the cell culturing device 32. And pulse oscillation laser lights 22 and 23 and output light 24 are emitted or detected through a window 33. As the material of the window, it is possible to use, e.g., optical glass, silica glass, etc. that transmit these lights and light according to the wavelengths of the pulse oscillation laser lights and output light.

Figure 5:
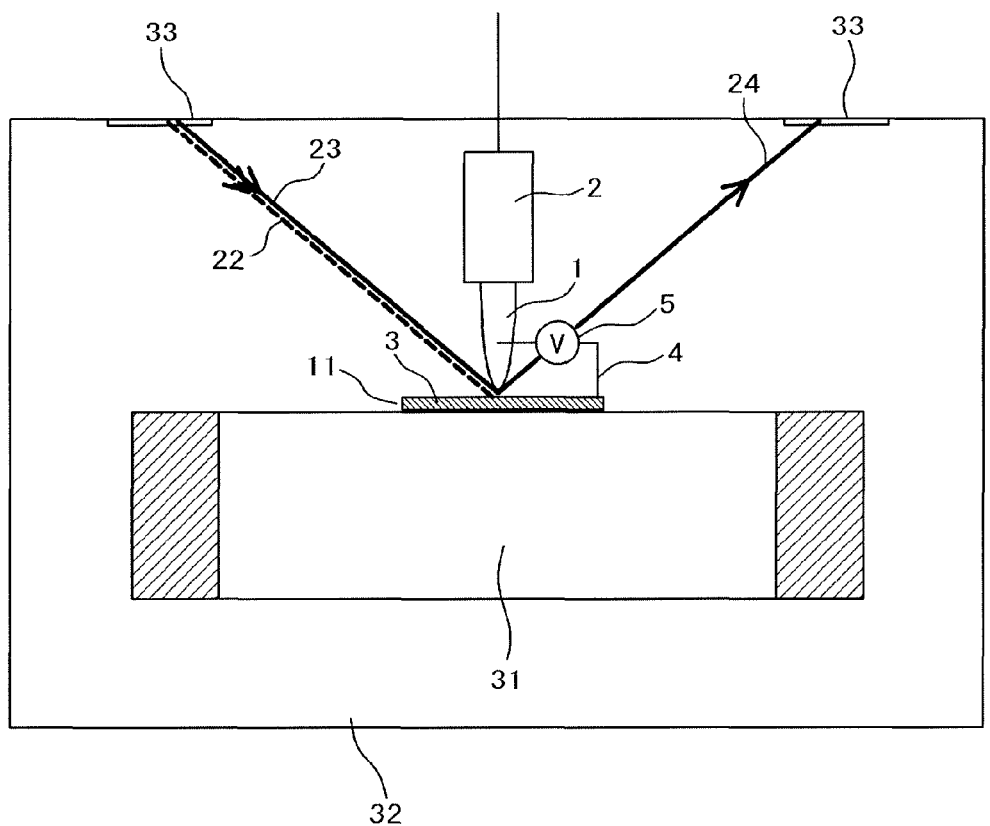
FIG. 5 is a general structural diagram of another scanning probe microscope according to the first embodiment of the present invention.

While, in the foregoing embodiment, measurement and evaluation of the interface between biomolecules, biotissues, or a biological substrate material and a culture fluid have been described mainly, the scanning probe microscope of the embodiment can also be used for evaluating an interface in semiconductor devices (e.g., a P-N junction interface) and measuring and evaluating, inter alia, an electrode-electrolyte interface in battery cells. In particular, an electrode-electrolyte interface in battery cells is an interface between a surface and liquid molecules like a biomaterial-culture fluid interface and application can be expected. In the case of measuring an electrode-electrolyte interface, there may be an electrolyte supply and exhaust mechanism as in FIG. 4; however, if the scanning probe microscope is only used for evaluating a solid interface, it does not need to have such a liquid supply and exhaust mechanism, as is depicted in FIG. 5. FIG. 5 depicts a scanning probe microscope installed inside a semiconductor inspection device 32; this microscope is not equipped with a liquid supply and exhaust mechanism in FIG. 4 and the specimen holder 11 does not have a structure for holding liquid.

According to the present embodiment, in the tip-enhanced scanning probe microscope, high-sensitivity detection is possible by using a pulse oscillation laser light including a greater number of photons per time corresponding to a pulse width. By shortening distance between the probing needle and the specimen and emitting pulse oscillation laser lights when the distance between the probing needle and the specimen has shortened, it is possible to optimize the tip enhancement effect and make detection at high sensitivity.

Example 2

Figure 6:
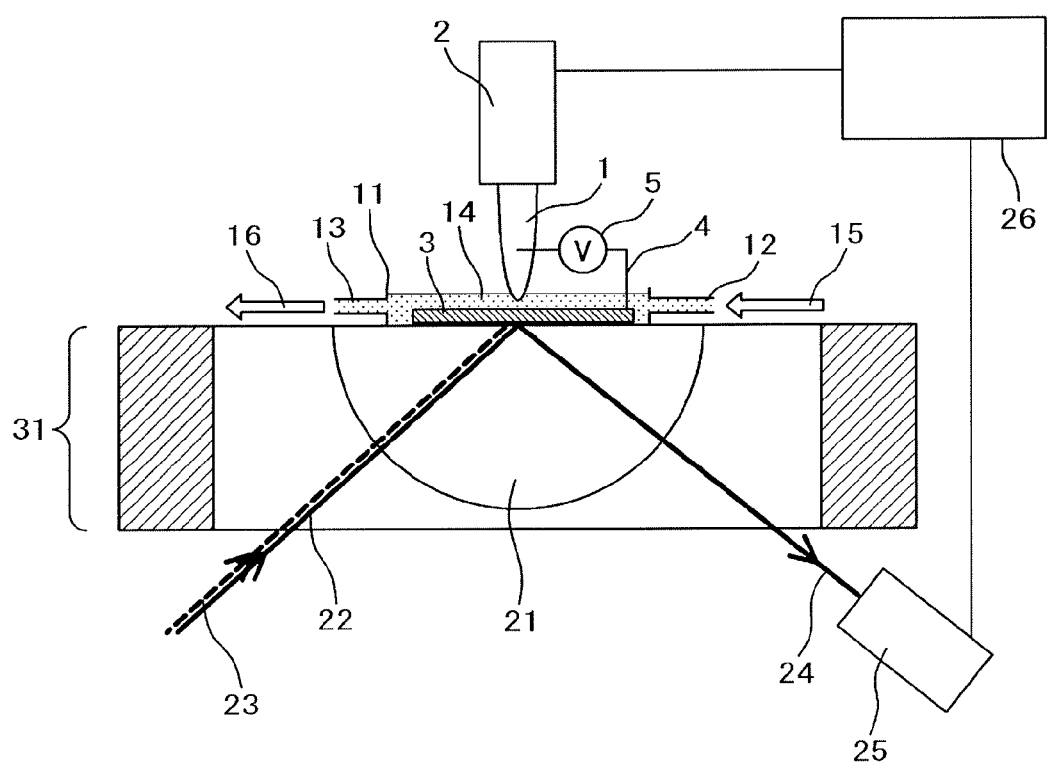
FIG. 6 is a general structural diagram of a scanning probe microscope of a second embodiment of the present invention.

This section discloses a tip-enhanced scanning sum-frequency microscope by means of a total reflection method as one form of a scanning probe microscope. FIG. 6 is a general structural diagram of a scanning probe microscope of a second embodiment of the present invention. Descriptions are provided, focusing on parts that differ from the scanning probe microscope of the first embodiment. In the present embodiment, a specimen 3 is installed on the upper surface of a prism 21. A specimen holder 11 has a ring-like shape or the thickness of its portion contacting with the prism 21 is very thin and a material that well transmits pulse oscillation laser lights is used. The specimen 3 is limited to a material that has a thin thickness and well transmits pulse oscillation laser lights. A pulse oscillation laser light which is input vertically, perpendicularly to the cylindrical surface of the prism 21 or plural pulse oscillation laser lights which are input synchronously are totally reflected by the specimen surface and scattered as output light 24. The intensity of the output light 24 is measured by a filter-equipped detector 25. In the present embodiment, a first pulse oscillation laser light 22 which is a green pulse oscillation laser light with a wavelength of 532 nm and a second pulse oscillation laser light 23 which is an infrared pulse oscillation laser light with a variable wavelength ranging from 2.3 to 10 microns are input synchronously. The output light 24 is input to the filter-equipped detector 25 and its intensity at a frequency (sum-frequency) as the sum of the frequency of the first pulse oscillation laser light 22 and the frequency of the second pulse oscillation laser light 23 is measured. By recording the intensity of the sum-frequency output light 24 that depends on the frequency of the second pulse oscillation laser light 23, a sum-frequency spectrum can be obtained. In the present embodiment, the following are performed: comparing a peak at a wavenumber of 3200 Kaiser and a peak at a wavenumber of 3400 Kaiser and measuring orientational proportions of tetrahedrally coordinated water molecules and asymmetrical bonded water molecules at the interface between polycarbonate and the culture fluid 14.

Example 3

This section discloses a tip-enhanced scanning second harmonic microscope as one form of a scanning probe microscope and other tip-enhanced scanning optical probe microscopes by means of linear and non-linear optical characteristics. In the present embodiment, descriptions are provided using FIG. 1, as is the case for the first embodiment.

In a tip-enhanced scanning second harmonic microscope according to the present embodiment, a first pulse oscillation laser light 22 which is an infrared pulse oscillation laser light with a wavelength of 1064 nm is input at or near a spot on a specimen 3 where the probing needle 1 gets close to. Output light 24 is input to the filter-equipped detector 25 and the light intensity at a frequency that is twice as much as the frequency of the first pulse oscillation laser light 22 is measured. Cultured nerve cells are used as the specimen 3. While measuring irregularities of the nerve cells by AFM, by mapping the second harmonic intensity, it is possible to configure a scanning second harmonic microscope and map the intensity of neural activity of the nerve cells. At the same time, the tip enhancement effect can be optimized in the same way as in the first embodiment and a tip-enhanced scanning second harmonic microscope can be configured.

In a tip-enhanced scanning Raman microscope according to the present embodiment, a first pulse oscillation laser light 22 which is a green pulse oscillation laser light with a wavelength of 532 nm is input at or near a spot on a specimen 3 where the probing needle 1 gets close to. Output light 24 is input to the filter-equipped detector 25 and the intensity of Raman scattering light is measured. Cultured liver cells are used as the specimen 3. While measuring irregularities of the liver cells by AFM, by inspecting Raman scattering, it is possible to map composition distribution of molecules, proteins, etc. in the liver cells. At the same time, the tip enhancement effect can be optimized in the same way as in the first embodiment and a tip-enhanced scanning Raman microscope can be configured.

In a tip-enhanced scanning CARS microscope according to the present embodiment, coherent anti-Stokes Raman scattering (CARS) is used. A first pulse oscillation laser light 22 (with an angular frequency ω1) and a second pulse oscillation laser light 23 (with an angular frequency ω2), these lights having different angular frequencies, are input synchronously at or near a spot on a specimen 3 where the probing needle 1 gets close to. Output light 24 is input to the filter-equipped detector 25 and the light intensity of CARS light is measured. While measuring irregularities of the specimen 3 by AFM, by inspecting the light intensity of the CARS light, it is possible to map composition distribution of molecules, proteins, etc. in the specimen 3. At the same time, the tip enhancement effect can be optimized in the same way as in the first embodiment and a tip-enhanced scanning CARS microscope can be configured.

Example 4

This section discloses an example of a specimen holder and electrodes for use in a scanning probe microscope.

Figure 7:
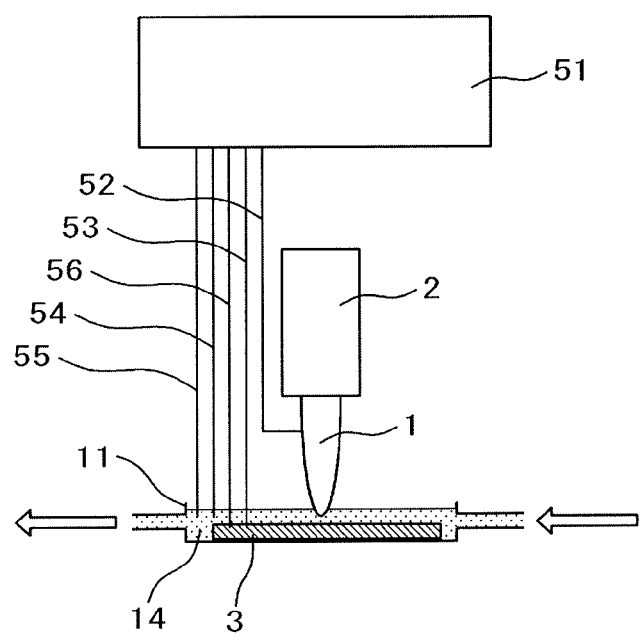
FIG. 7 is a general structural diagram depicting an example of a specimen holder and electrodes according to a fourth embodiment of the present invention.

FIG. 7 is a general structural diagram depicting an example of a specimen holder and electrodes for use in a scanning probe microscope of the present invention. A bipotentiostat 51 which is controlled by the control device 26 controls a probing needle electrode 52, a specimen electrode 53, a working electrode 54, and a reference electrode 55. Potential of a culture fluid 14 is measured by the reference electrode 55, voltage of the probing needle 1 to act on the culture fluid 14 is applied by the probing needle electrode 52, and voltage of the specimen 3 to act on the culture fluid 14 is applied by the specimen electrode 53. At this time, current flowing between the culture fluid 14 and the reference electrode 55 is nearly zero. To allow current to flow between the culture fluid 14 and the specimen 3 and induce, e.g., a chemical reaction, current between the working electrode 54 and the specimen electrode 53 is used. For applying voltage between the probing needle 1 and the specimen 3, voltage is applied between the probing needle electrode 52 and the specimen electrode 53. For configuring a scanning tunnel microscope in a scanning probe microscope according to an embodiment of the present invention, voltage and current between the probing needle electrode 52 and the specimen electrode 53 are used as applied voltage and tunnel current. For injecting charge to the specimen 3, a charge injection electrode 56 is used.

As is the case for the first embodiment, the probing needle 1 is oscillated in a direction perpendicular to the surface of the specimen 3 by oscillating the oscillator 2 at a frequency near to its natural frequency (within ±1% of the natural frequency). A phase difference between an AC voltage that is applied to the oscillator 2 and a current flowing into the oscillator 2 is used as a measure for quantifying the interaction (force) between the probing needle 1 and the specimen 3 and the distance between probing needle and specimen.

INDUSTRIAL APPLICABILITY

It would become possible to measure and evaluate an interface between biomolecules, biotissues, or a biological substrate material and a culture fluid in the culture fluid and the invention can be applied to evaluation of culture substrates, water purifying membranes, and cells in culture. Moreover, the invention can be used for measurement and evaluation of physical information on an interface in semiconductor devices, an electrode-electrolyte interface in battery cells, etc.

LIST OF REFERENCE NUMERALS

1 . . . Probing needle
2 . . . Oscillator
3 . . . Specimen
4 . . . Wiring line
5 . . . Power supply for probing needle
11 . . . Specimen holder
12 . . . Culture fluid inlet
13 . . . Culture fluid outlet
14 . . . Culture fluid (water, solvent)
15 . . . Culture fluid incoming
16 . . . Culture fluid outgoing
17 . . . Culture fluid supply and exhaust mechanism
18 . . . Culture fluid supply container
19 . . . Culture fluid exhaust container
21 . . . Prism
22 . . . First pulse oscillation laser light
23 . . . Second pulse oscillation laser light
24 . . . Output light
25 . . . Filter-equipped detector
26 . . . Control device
27, 28 . . . Laser oscillator
31 . . . Scanning mechanism
32 . . . Cell culturing device or semiconductor inspection device among others
33 . . . Window
35 . . . Turn-off of feedback for probing needle oscillation
36 . . . Pulse oscillation laser that is oscillated in sync with oscillation
37 . . . Turn-on of feedback for probing needle oscillation
41 . . . Output light peak under a geometric condition that the probing needle does not block light
42 . . . Output light peak under tip enhancement effect
51 . . . Bipotentiostat
52 . . . Probing needle electrode
53 . . . Specimen electrode
54 . . . Working electrode
55 . . . Reference electrode
56 . . . Charge injection electrode

The invention claimed is:
1. A scanning probe microscope comprising:
a probing needle;
a specimen holder in which a specimen is mounted;
an oscillator that produces a periodic oscillation to change the probing needle position;

a pulse oscillation type laser light source that emits light toward a spot, which is put under measurement by the probing needle, on the specimen;

a detector that measures intensity of output light which is output from the specimen by energy spectroscopy;

a scanning mechanism that moves the specimen holder; and a control device, wherein the control device is configured to control a relative distance between the probing needle and the specimen, to synchronize shortening of the distance between the probing needle and the specimen and emission of pulse oscillation laser light, and to measure output light peaks associated with a tip enhancement effect which overlap in time with a period of decreased output light from the pulse oscillation laser lights which are blocked by the probing needle, so as to optimize efficiency of tip-enhanced detection.

2. The scanning probe microscope according to claim 1, wherein the control device is further configured to decrease amplitude of the periodic oscillation to change the probing needle position by the oscillator.

3. The scanning probe microscope according to claim 2, wherein, in order to synchronize shortening of the distance between the probing needle and the specimen and emission of pulse oscillation laser light, the control device turns off feedback for probing needle oscillation, forcibly brings the probing needle closer to the specimen, and causes emission of the pulse oscillation laser light to occur at a point of time when the amplitude of the probing needle has decreased.

4. The scanning probe microscope according to claim 1, wherein the probing needle is positioned in near-field light generated on the surface of the specimen and electric field strength of light near the specimen surface is amplified.

5. The scanning probe microscope according to claim 4, wherein pulse laser light is directed to come from the probing needle side toward the specimen and reflected pulse laser light is detected at the probing needle side.

6. The scanning probe microscope according to claim 4, wherein a prism is installed in a position opposite to the probing needle, the specimen is mounted on an upper surface of the prism, and pulse laser light is directed to come from the prism side toward the specimen and totally reflected pulse laser light is detected at the prism side.

7. The scanning probe microscope according to claim 1, wherein the pulse laser light comprises a first pulse laser light and a second pulse laser light whose wavelength is variable and the output light is a sum-frequency light.

8. The scanning probe microscope according to claim 1, wherein the output light is a second harmonic of the pulse laser light.

9. The scanning probe microscope according to claim 1, wherein the output light is a Raman scattering light of the pulse laser light.

10. The scanning probe microscope according to claim 1, wherein the pulse laser light comprises a first pulse laser light and a second pulse laser light whose wavelength is variable and the output light is a coherent anti-Stokes Raman scattering light.

11. The scanning probe microscope according to claim 1, wherein the specimen holder has a function of holding and circulating a culture fluid.

12. The scanning probe microscope according to claim 1, wherein at least the probing needle, the oscillator, the specimen holder, and the scanning mechanism are installed inside a culturing device or an inspection device.

13. The scanning probe microscope according to claim 1, wherein the specimen is a biomaterial such as biomolecules, biological cells, and biotissues which are cultured in a culture fluid.

14. A measuring method using a scanning probe microscope comprising:

a probing needle;

a specimen holder in which a specimen is mounted;

an oscillator that produces a periodic oscillation to change the probing needle position;

a pulse oscillation type laser light source that emits light toward a spot, which is put under measurement by the probing needle, on the specimen;

a detector that measures intensity of output light which is output from the specimen by energy spectroscopy;

a scanning mechanism that controls the probing needle position relative to the specimen holder; and a control device, wherein the control device is configured to decrease an amplitude of the periodic oscillation to change the probing needle position by the oscillator, to shorten a relative distance between the probing needle and the specimen to synchronize shortening of the distance between the probing needle and the specimen and emission of pulse oscillation laser light, and to measure output light peaks associated with a tip enhancement effect which overlap in time with a period of decreased output light from the pulse oscillation laser lights which are blocked by the probing needle, so as to optimize efficiency of tip-enhanced detection.

15. The measuring method using the scanning probe microscope according to claim 14, wherein comprising the steps of turning off feedback for probing needle oscillation, forcibly bringing the probing needle closer to the specimen, and causing emission of the pulse oscillation laser light to occur at a point of time when the amplitude of the probing needle has decreased in order to synchronize shortening of the distance between the probing needle and the specimen and emission of pulse oscillation laser light.

* * * * *